US 010831051B2

(12) United States Patent
Jerregard et al.

(10) Patent No.: US 10,831,051 B2
(45) Date of Patent: Nov. 10, 2020

(54) DISPLAY, ELECTRONIC DEVICE AND TEACH PENDANT FOR ROBOT

(71) Applicant: ABB Schweiz AG, Baden (CH)

(72) Inventors: Henrik Jerregard, Västerås (SE); Long Zeng, Zhejiang (CN); Tao Zhang, Shanghai (CN); Taiyang Xiao, Shanghai (CN); Dun Chen, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/381,386

(22) Filed: Apr. 11, 2019

(65) Prior Publication Data

US 2019/0317359 A1 Oct. 17, 2019

(30) Foreign Application Priority Data

Apr. 11, 2018 (CN) ..................... 2018 2 0510432 U

(51) Int. Cl.
*G02F 1/1333* (2006.01)
*H04M 1/02* (2006.01)

(52) U.S. Cl.
CPC .... *G02F 1/133308* (2013.01); *H04M 1/0266* (2013.01); *G02F 2001/133325* (2013.01); *G02F 2001/133331* (2013.01)

(58) Field of Classification Search
CPC ......... G02F 1/133308; G02F 1/133608; G02F 2011/13332; G02F 2011/13331
See application file for complete search history.

(56) References Cited

U.S. PATENT DOCUMENTS

| 8,008,570 | B2 | 8/2011 | Han et al. |
| 8,427,598 | B2 | 4/2013 | Horie |
| 8,947,866 | B2 | 2/2015 | Jacobs et al. |
| 2009/0054115 | A1 | 2/2009 | Horrdin et al. |
| 2013/0250205 | A1 | 9/2013 | Ogatsu |

(Continued)

FOREIGN PATENT DOCUMENTS

| CN | 206339806 U | 7/2017 |
| CN | 206877605 U | 1/2018 |
| EP | 3079033 A1 | 10/2016 |

OTHER PUBLICATIONS

European Patent Office, Extended European Search Report issued in corresponding European application No. 19168410.9, dated Jul. 26, 2019, 8 pp.

*Primary Examiner* — Dung T Nguyen
(74) *Attorney, Agent, or Firm* — Taft Stettinius & Hollister LLP; J. Bruce Schelkopf

(57) ABSTRACT

The present disclosure relates to a display, an electronic device and a teach pendant for a robot. The display comprises a top cover, a bottom cover and a display module. The display module comprises a glass plate and a base. The glass plate is provided with a display screen component at one side. The base is provided with a bracket thereon. The glass plate is bonded to the bracket, such that the display screen component is received in an opening enclosed by the bracket. The base comprises a bonding portion disposed outside the bracket for bonding the top cover and the bottom cover. The glass plate is positioned in an opening of the top cover, and a top surface of the glass plate is flush with a top surface of the top cover. Embodiments of the present disclosure provide a flat display.

17 Claims, 5 Drawing Sheets

(56) References Cited

U.S. PATENT DOCUMENTS

2014/0313746 A1 10/2014 Song et al.
2015/0192730 A1 7/2015 Ok
2015/0331451 A1* 11/2015 Shin .................... G06F 1/1637
                                                        345/173
2016/0299527 A1* 10/2016 Kwak ................. H04M 1/0266

* cited by examiner

DISPLAY, ELECTRONIC DEVICE AND TEACH PENDANT FOR ROBOT

FIELD

Embodiments of the present disclosure generally relate to the field of display modules, and more specifically, to a display, an electronic device comprising the display, and a teach pendant for a robot.

BACKGROUND

A display module is typically integrated into a variety of electronic devices, such as a cell phone, a computer, a TV, a controller (for example, a teach pendant for a robot) and the like, to display a user interface and/or receive input from the user. A known display module (for example, a glass plate of the display module) is assembled below a top cover of an electronic device, causing the top surfaces of the display module and the device to be on different planes. A flat display module flush with the top surface of the device is desirable for the industrial design and aesthetics requirement.

In order to provide such a flat display module, a solution is to use glue to bond the display module onto a top cover of an electronic device. Such a permanent bonding of the display module and the electronic device makes it difficult to detach the display module from the top cover. In the solution, when the display module would be detached from the electronic device for replacement or maintenance purpose, other components of the electronic device may be damaged. If the display module would not detached, the whole electronic device has to be replaced even though only the display module is damaged (for example, the glass plate is broken), which is apparently cost-inefficient.

SUMMARY

Embodiments of the present disclosure provide a display, an electronic device and a teach pendant for a robot, to at least partly solve the above and/or other potential problems in the conventional solution.

In a first aspect of the present disclosure, there is provided a display. The display comprises a top cover, a bottom cover and a display module. The display module comprises a glass plate provided with a display screen component at one side; and a base provided with a bracket thereon, wherein the glass plate is bonded to the bracket, such that the display screen component is received in an opening enclosed by the bracket. The base comprises a bonding portion disposed outside the bracket for bonding the top cover and the bottom cover, the glass plate is positioned in an opening of the top cover, and a top surface of the glass plate is flush with a top surface of the top cover.

It is noted that the term "flush" used herein takes the errors in actual manufacturing into account, and thus can be referred to as "substantially flush." In this way, the top surface of the glass plate and the top surface of the top cover are in the same plane, that is, there is no step between the top surface of the glass plate and the top surface of the top cover. Therefore, there is provided a flat display to meet demands of various electronic devices on the flat display.

Alternatively, in some embodiments, a seal gasket is provided between the bonding portion and the top cover, and the display module is detachable from the top cover and the bottom cover. In these embodiments, the display module is assembled detachably with the top cover and the bottom cover, allowing the display module to be detached from the top cover and the bottom cover where necessary, without damaging other components. There is provided a replaceable display module, which reduces the maintenance cost. In addition, the seal gasket ensures the sealing of the display.

Alternatively, in some embodiments, a groove is provided at a position on the bonding portion corresponding to the seal gasket. The groove can reduce the contact area between the bonding portion of the base and the seal gasket, thereby decreasing the press force for mounting the seal gasket.

Alternatively, in some embodiments, the seal gasket comprises an inner ring and an outer ring formed integrally, wherein the inner ring is disposed between the bonding portion and the top cover, and the outer ring is disposed between the top cover and the bottom cover. In this way, in addition to the sealing between the bonding portion and the top cover, sealing is also provided between the top cover and the bottom cover. By integrating the two seals onto the same seal gasket, costs on parts and assembling costs can be reduced accordingly.

Alternatively, in some embodiments, a mounting portion is provided on the bonding portion to couple the display module to at least one of the top cover and the bottom cover. In this way, a reliable assembling of the display module to the top cover and the bottom cover is provided.

Alternatively, in some embodiments, the base comprises an opening. The opening disposed in the base not only reduces the weight of the display module, but also facilitates the dissipation of heat generated by the display screen component received in the opening enclosed by the bracket.

Alternatively, in some embodiments, the glass plate is bonded to the bracket via an adhesive. There is provided a simple, reliable manner of bonding the glass plate to the bracket.

Alternatively, in some embodiments, the opening enclosed by the bracket is of a rectangular, square, round or oval shape. These embodiments are adapted to provide displays with different shapes, thereby meeting the demands on product diversity.

In a second aspect of the present disclosure, an electronic device according to embodiments of the present disclosure comprises the display according to the first aspect of the present disclosure. In this way, there is provided an electronic device comprising a flat display. In addition, the electronic device comprises any one of the displays as described above, and therefore is also advantageous in the aspects as described above.

In a third aspect of the present disclosure, a teach pendant (TPU) for a robot according to embodiments of the present disclosure comprises a display according to the first aspect of the present disclosure. In this way, there is provided a teach pendant comprising a flat display, to meet industrial design and aesthetics requirements. Moreover, the teach pendant comprises any one of the displays as described above, and therefore is also advantageous in the aspects as described above.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

DETAILED DESCRIPTION OF EMBODIMENTS

Figure 1:
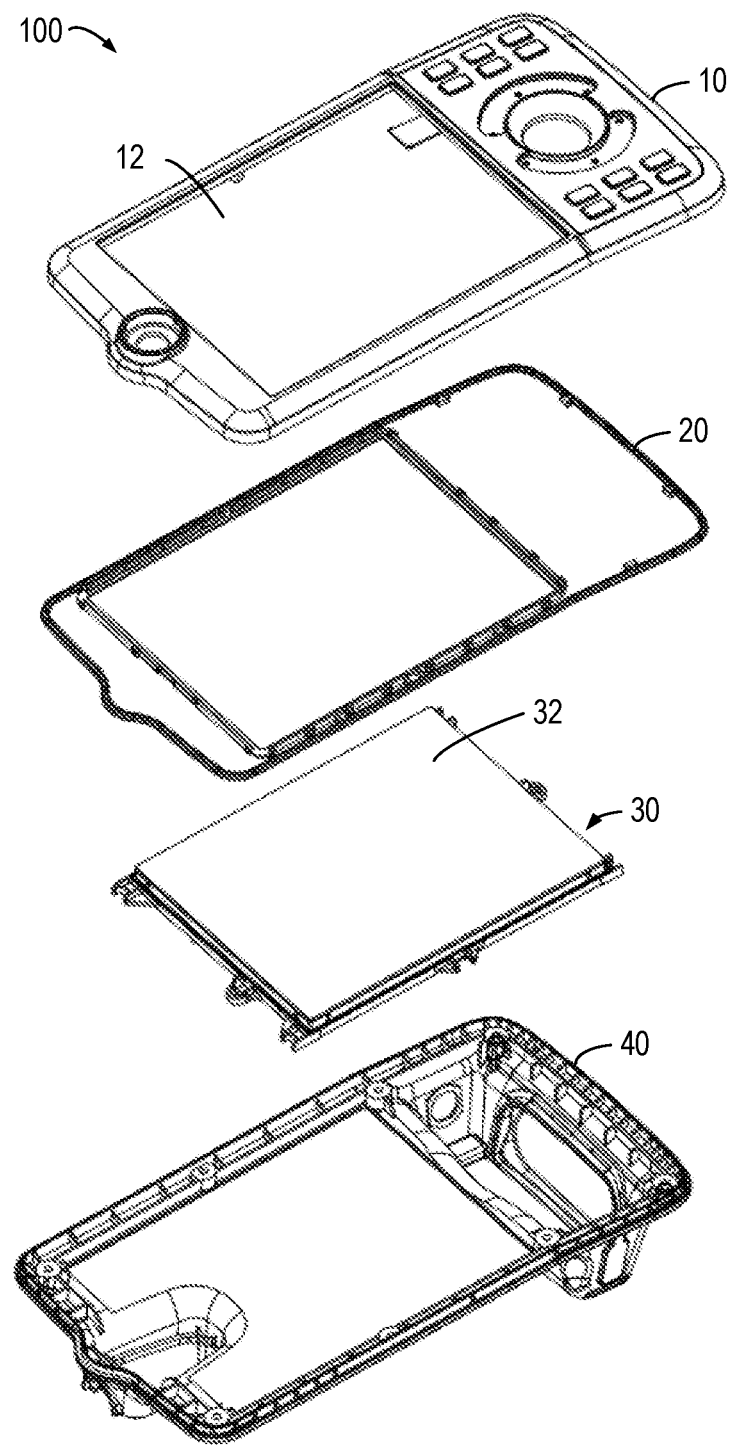
FIG. 1 is a schematic exploded view of a display according to an example embodiment of the present disclosure.

Principles of example embodiments disclosed herein will now be described with reference to various example embodiments illustrated in the drawings. It is to be understood that description of those embodiments is merely to enable those skilled in the art to better understand and further implement example embodiments disclosed herein and is not intended for limiting the scope disclosed herein in any manner. It is noted that the similar or same reference signs may be employed throughout the drawings where appropriate, and the similar or same reference signs may represent similar or same functionality. Those skilled in the art would readily realize that, in the description below, alternative embodiments of the structure and method described herein are applicable without departing from principles of the present disclosure.

Embodiments of the present disclosure provide a display to at least address the need of a flat display in the prior art. According to embodiments of the present disclosure, a support is provided for a display module, which includes a base and a bracket. By means of the support, the display module can be mounted to, for example, a top cover, and a gasket for sealing can be provided between the support and the top cover. In this way, embodiments of the present disclosure can achieve the effects of: allowing the display module to be assembled in the same plane as the top surface of the whole product; detaching the display module without damaging any component; and providing a good waterproof, dust-proof performance. The replaceable flat display can be assembled and disassembled easily. When the display module is to be replaced or repaired, no component will be damaged during detaching. Therefore, its maintenance is easy to operate and its cost is low. Principles of the present disclosure will be described hereinafter with reference to FIGS. 1-7.

Figure 2:
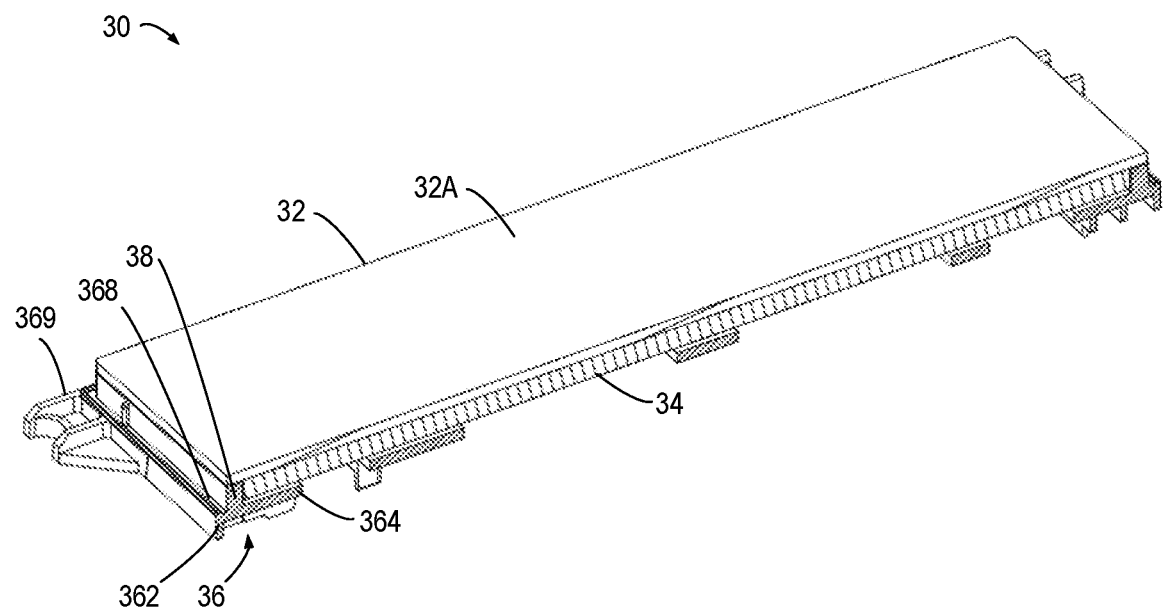
FIG. 2 illustrates a schematic sectional view of a display module of the display as shown in FIG. 1.
Figure 3:
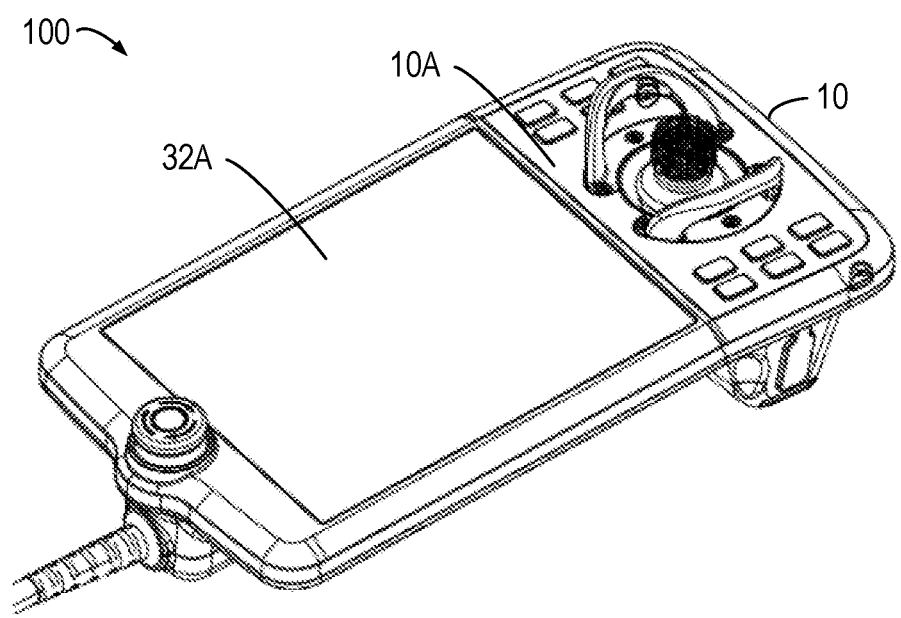
FIG. 3 illustrates a schematic perspective view of the display as shown in FIG. 1 in an assembly state.
Figure 4:
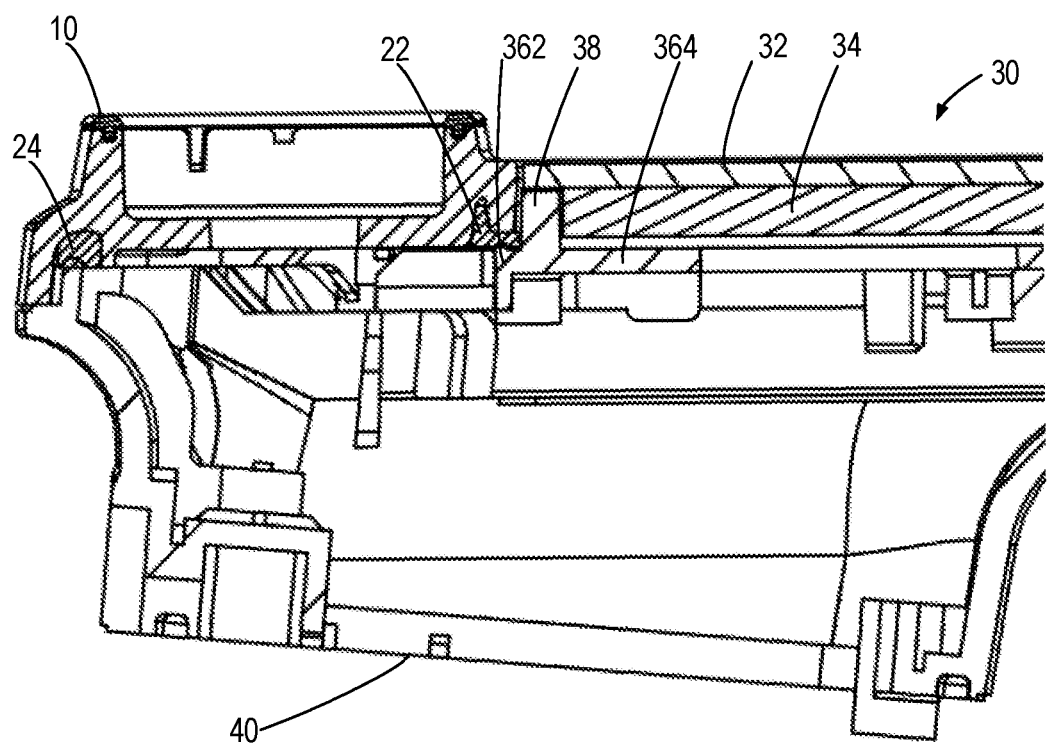
FIG. 4 illustrates a part of a schematic cross section of the display as shown in FIG. 3.

FIG. 1 illustrates a schematic exploded view of a display 100 according to an example embodiment of the present disclosure; FIG. 2 illustrates a schematic sectional view of a display module 30 of the display 100 as shown in FIG. 1; FIG. 3 illustrates a schematic perspective view of the display 100 as shown in FIG. 1 in an assembly state; and FIG. 4 illustrates a part of a schematic cross section of the display 100 as shown in FIG. 3.

As shown in FIGS. 1-4, the display 100 includes a top cover 10 and a bottom cover 40. A display module 30 is provided in a space formed between the top cover 10 and the bottom cover 40. The display module 30 generally includes a glass plate 32 and a base 36. On one side of the glass plate 32, there is provided a display screen component 34 for display. For example, the display screen component 34 may be pre-bonded on one surface of the glass plate 32 by using glue. The display component 34 described herein may refer to display material (for example, liquid crystal material) and/or related electronic components capable of providing the display function. As an example, the display screen component 34 may provide a touch screen and a display screen, while the glass plate 32 acts as a protection layer.

As shown in FIG. 2, the bracket 38 is provided on the base 36. For example, the bracket 38 may extend upwards (in particular, longitudinally) from a surface of the base 36. An opening may be formed by the bracket 38. In other words, the bracket 38 may be an annular bracket. The glass plate 32 may be bonded onto the top of the bracket 38 in a manner that the display screen component 34 on the glass plate 32 faces the base 36. As such, the top surface 32A of the glass plate 32 forms the top surface of the display module 30. After the glass plate 32 is bonded to the bracket 38, the display screen component 34 is received within the opening enclosed by the bracket 38. In this way, a support including the base 36 and the bracket 38 is designed for a glass plate 32 and a display screen component 34 (which are basic components of the display module). As discussed hereinafter, the support facilitates assembling and disassembling of the display module 30.

The base 36 includes a bonding portion 362 disposed outside the bracket 38 for bonding the top cover 10 and the bottom cover 40. The bonding portion 362 is adapted to be sandwiched between corresponding portions of the top cover 10 and the bottom cover 40, such that the display module 30 may be mounted between the top cover 10 and the bottom cover 40. For example, the bonding portion 362 may protrude outwardly (in particular, laterally) from the bracket 38 at the bottom of the bracket 38, such that the bonding portion 362 and the bracket 38 form an "L" shape. In a manner that the top surface 32A of the display module 30 (i.e., the top surface 32A of the glass plate 32) faces the opening 12 in the top cover 10, the display module 30 may be first fixed to the top cover 10 by aligning the glass plate 32 with the opening 12 of the top cover 10. The combination of the display module 30 and the top cover 10 is then coupled to the bottom cover 40, such that the display module 30 is mounted between the top cover 10 and the bottom cover 40. After the display module 30 is mounted to the top cover 10 and the bottom cover 40, the glass plate 32 may be positioned at least partly in the opening 12 of the top cover 10, and the top surface 32A of the glass plate 32 is substantially flush with the top surface 10A of the top cover 10 (which forms the top surface of the display 100) (see FIG. 3). The term "substantially flush" is intended to indicate that: the term "flush" used herein is not in a strict sense, but considering errors during the manufacturing.

As a result, different than the conventional solutions in which the glass plate is disposed above or below the top cover, in embodiments of the present disclosure, the top surface 32A of the glass plate 32 and the top surface 10A of the top cover 10 may be substantially in the same plane. That is, there is no apparent step between the top surface 32A of the glass plate 32 and the top surface 10A of the top cover 10. Therefore, the display according to embodiments of the present disclosure is a flat display, and can meet the demands of various electronic devices on the flat display.

In some embodiments, the display module 30 may be detached from the top cover 10 and the bottom cover 40. In other words, the display module 30 may be assembled detachably with the top cover 10 and the bottom cover 40, rather than permanently bonding to the top cover 10 and the bottom cover 40 such as using glue. It is because the glass plate 32 and the display screen component 34 of the display module 30 are bonded in advance to the support formed by the base 36 and the bracket 38, and the support (in particular, the bonding portion 362 of the base 36) facilitates detachable assembling of the display module 30. In order to ensure sealing of the display 100, a seal gasket 20 may be provided between the bonding portion 362 and the top cover 10 (as shown in FIG. 1). The seal gasket 20 seals the display 100 to protect it from water or dust intruded from the top surface of the display 100. In such an embodiment, when replaced or repaired, for example, due to breakage of the glass plate 32 or damage to the display screen component 34, it is possible for the display module 30 to be detached from the top cover 10 and the bottom cover 40 easily, without damaging any other component. Hence, a replaceable display module 30 is provided, such that it is possible to replace the display module 30 only if necessary, rather than the whole display 100. The maintenance cost is reduced.

In some embodiments, as shown in FIG. 2, a groove 368 may be provided at a position on the bonding portion 362 of the base 36 corresponding to the seal gasket 20. The presence of the groove 368 may reduce the contact area between the bonding portion 362 and the seal gasket 20, thereby causing a press force for mounting the seal gasket 20 not too great. In addition, after mounting the display module 30 to the top cover 10 and the bottom cover 40, there may be a gap between respective portions of the top cover 10 and the glass plate 32 opposite to each other, thus, when the display 100 falls down, avoiding crush on the glass plate 32 forming the screen.

Figure 5:
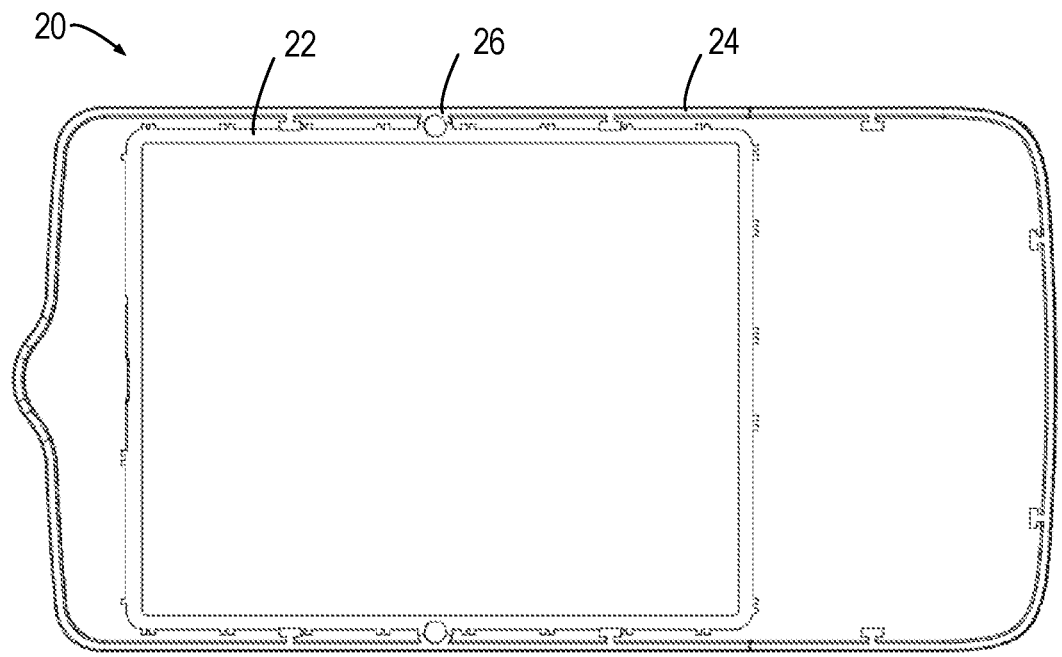
FIG. 5 illustrates a schematic top view of a sealing gasket according to an example embodiment of the present disclosure.

FIG. 5 illustrates a schematic top view of a sealing gasket 20 according to an example embodiment of the present disclosure. In some examples, the seal gasket 20 includes an inner ring 22 and an outer ring 24 formed integrally. Merely as an example, the inner ring 22 and the outer ring 24 may be connected to each other via a connection portion 26. With reference to FIG. 4 again, the inner ring 22 may be disposed between the bonding portion 362 of the base 36 and the top cover 10, while the outer ring 24 may be disposed between the top cover 10 and the bottom cover 40. In this way, in addition to providing a sealing between the bonding portion 362 and the top cover 10, a sealing can also be provided between the top cover 10 and the bottom cover 40. Integrating the two seals onto the same part (i.e., the seal gasket 20) not only saves the cost of the parts, but also enables convenient assembling of the display 100, thereby reducing the assembling cost. For example, the seal gasket 20 may be formed from a rubber material.

Figure 6:
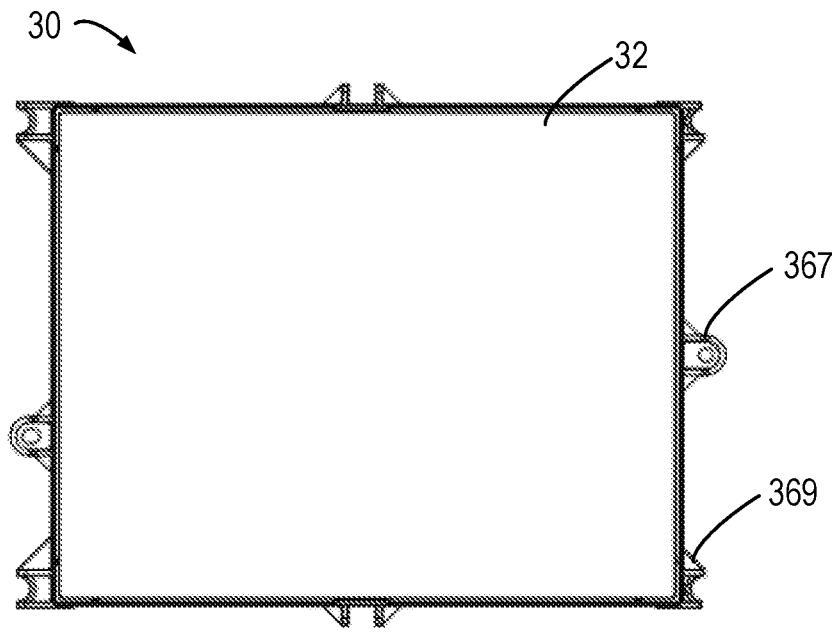
FIG. 6 illustrates a schematic top view of the display module as shown in FIG. 2.
Figure 7:
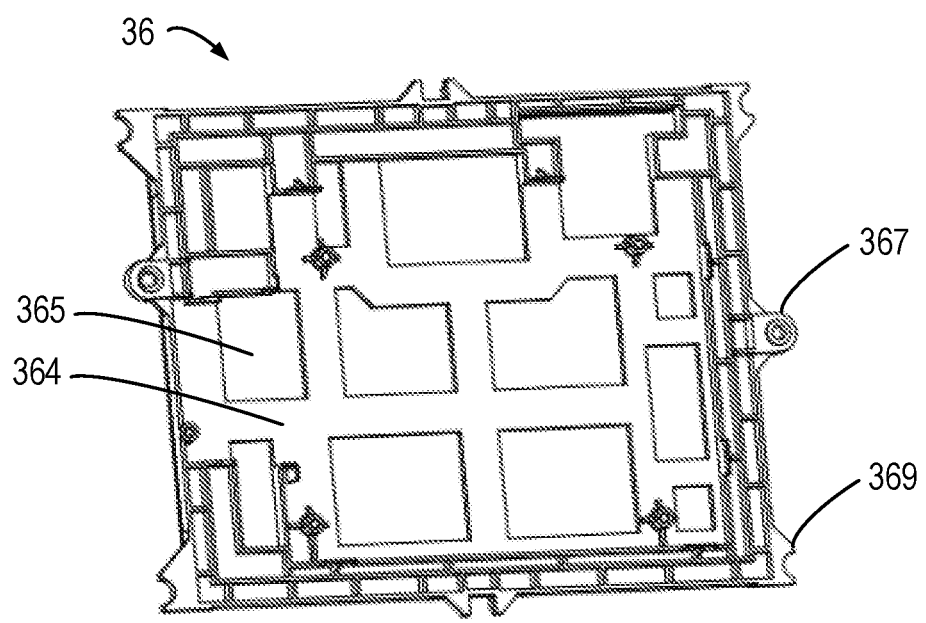
FIG. 7 illustrates a schematic bottom view of a base of the display module as shown in FIG. 2.

FIG. 6 illustrates a schematic top view of the display module 30 as shown in FIG. 2, and FIG. 7 illustrates a schematic bottom view of a base 36 of the display module 30 as shown in FIG. 2. In some embodiments, a mounting position may be provided at the periphery of the base 36. For example, a mounting portion 367 is disposed on the bonding portion 362 of the base 36, to couple the display module 30 to at least one of the top cover 10 and the bottom cover 40 by fastening the base 36. Merely as an example, the mounting portion 367 may have threads to fasten the display module 30 to the top cover 10 by means of screws. In some embodiments, an additional mounting portion 369 may be provided on the bonding portion 362 of the base 36. The additional mounting portion 369 may include a through hole, such that a fastener can pass through the additional mounting portion 369 when connecting the top cover 10 with the bottom cover 40. For example, the additional mounting portion 369 is a through hole without threads. The additional mounting portion 369 is not limited to a complete through hole, but may be a part of the through hole, as shown in FIGS. 6 and 7. Moreover, as shown in FIGS. 6 and 7, the mounting portion 367 for securing the display module 30 may be positioned at the edge of the base 36, while the additional mounting portion 369 for connecting the top cover 10 and the bottom cover 40 may be positioned at a corner of the base 36. Alternatively, other positions of the mounting portion 367 and the additional mounting portion 369 are possible. Alternatively, the functions of the mounting portion 367 and the additional mounting portion 369 are exchangeable. In this way, a reliable assembling of the display module 30 to the top cover 10 and the bottom cover 40 is provided.

In some embodiments, the base 36 includes an opening 365. Referring back to FIG. 2, the base 36 may further include a portion 364 within the bracket 38. As shown in FIG. 7, the portion 364 of the base 36 may include an opening 365. The opening 365 not only reduces the weight of the display module 30, but also acts as a vent to quickly dissipate the heat generated by the display screen component 34. Furthermore, an electrical connection between the display screen component 34 and an electronic component outside the display module 30 may be implemented through the opening 365.

In some embodiments, the glass plate 32 may be bonded onto the top of the bracket 38 via an adhesive. For example, the adhesive is glue, a double-sided tape or any other adhesive materials. Therefore, there is provided a simple and reliable manner of bonding the glass plate 32 to the top of the bracket 38, and the display screen component 34 may be sealed into the opening enclosed by the bracket 38.

In some embodiments, the opening enclosed by the bracket 38 is rectangular, square, round, oval or in any other appropriate shape. In other words, "annular bracket" is intended to refer to forming an opening at the center of the bracket 38, rather than that the bracket 38 is necessarily of a circle shape or an oval shape. The shape of the bracket 38 is not limited to the present disclosure, which in turn allows the glass plate 32 on the top of the bracket 38 to be of any other appropriate shape. Such an embodiment is suitable for providing displays 100 with different shapes, so as to meet the demands on product diversity.

In some examples, the bracket 38 may form a closed circle, thereby forming an opening at the center thereof. The bracket 38 and the base 36 may be formed integrally, thereby forming an integral support for the display module 30. This not only facilitates the bonding of the glass plate 32 of the display screen component 34 to the support, but also ensures the sealing performance of the display module 30.

The display 100 according to the present disclosure has been described above with reference to the drawings. The display 100 is applicable to an electronic device. In some embodiments, the top cover 10 and the bottom cover 40 of the display 100 form an outer housing of the electronic device. In these embodiments, the top surface 10A of the top cover 10 forms the top surface of the electronic device. In this way, the top surface 32A of the glass plate 32 may be substantially flush with the top surface of the electronic device, thereby providing an electronic device comprising a flat display. In addition to the display module 30, other electronic components associated with the electronic device may be received in the space between the top cover 10 and the bottom cover 40.

In some embodiments, the display 100 may be used in a teach pendant for a robot. FIG. 3 illustrates, in fact, an appearance of a teach pendant including a display 100 according to the present disclosure. In this way, a teach pendant including a flat display can be provided to meet industrial design and aesthetics requirement.

Although the following claims of the present application are formulated for a particular combination of features, it is to be understood that the scope of the present disclosure further covers any novel feature explicitly or implicitly disclosed herein or generalized therefrom, or any novel combination of features, regardless of involving the same solution claimed in any of the claims.

We claim:

1. A display, wherein the display comprises:
   a top cover and a bottom cover; and
   a display module comprising:
   a glass plate provided with a display screen component at one side; and
   a base with a portion disposed below the display screen component, the base being provided with a bracket thereon extending upward from the portion to define an opening, wherein the glass plate is bonded to the bracket, such that the display screen component is received in the opening enclosed by the bracket;
   wherein the base comprises a mounting portion disposed outside the bracket to couple the display module to at least one of the top cover and the bottom cover, the top cover, the bottom cover and the base being detachably assembled, the glass plate is positioned in an opening of the top cover, and a top surface of the glass plate is flush with a top surface of the top cover.

2. The display according to claim 1, wherein a seal gasket is provided between the base and the top cover.

3. The display according to claim 2, wherein a groove is provided at a position on the base corresponding to the seal gasket.

4. The display according to claim 2, wherein the seal gasket comprises an inner ring and an outer ring formed integrally, wherein the inner ring is disposed between the base and the top cover, and the outer ring is disposed between the top cover and the bottom cover.

5. The display according to claim 1, wherein the base comprises an opening through the portion disposed below the display screen component to dissipate heat generated by the display screen component.

6. The display according to claim 1, wherein the glass plate is bonded to the bracket via an adhesive.

7. The display according to claim 6, wherein the glass plate is bonded onto a top of the bracket via the adhesive.

8. The display according to claim 1, wherein the opening enclosed by the bracket is of a rectangular, square, round or oval shape.

9. An electronic device, wherein the electronic device comprises a display according to claim 1.

10. A teach pendant for a robot comprising a display according to claim 1.

11. The display according to claim 1, wherein the mounting portion is detachably coupled to the top cover.

12. The display according to claim 11, wherein the mounting portion is detachably coupled to the top cover with threaded screws.

13. The display according to claim 12, wherein the top cover is connected to the bottom cover with a fastener.

14. The display according to claim 11, wherein a seal gasket is provided between the base and the top cover.

15. The display according to claim 14, wherein a groove is provided at a position on the base corresponding to the seal gasket.

16. The display according to claim 14, wherein the seal gasket comprises an inner ring and an outer ring formed integrally, wherein the inner ring is disposed between the base and the top cover, and the outer ring is disposed between the top cover and the bottom cover.

17. The display according to claim 14, wherein the display screen component is bonded to the glass plate with glue.

* * * * *